United States Patent
Sakakida et al.

(10) Patent No.: US 6,959,947 B2
(45) Date of Patent: Nov. 1, 2005

(54) FRONT SEATBELT SYSTEM FOR VEHICLE

(75) Inventors: Masafumi Sakakida, Hiroshima (JP);
Hiroaki Nakao, Hiroshima (JP);
Satoshi Nishikaji, Hiroshima (JP);
Ippei Yamachi, Hiroshima (JP);
Kazuhiko Yoshikawa, Hiroshima (JP);
Akira Sone, Hiroshima (JP); Takeshi Murai, Hiroshima (JP); Masanobu Kosaka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 268 days.

(21) Appl. No.: 10/390,190

(22) Filed: Mar. 18, 2003

(65) Prior Publication Data
US 2003/0217882 A1 Nov. 27, 2003

(30) Foreign Application Priority Data
Mar. 28, 2002 (JP) .................................. 2002-091580

(51) Int. Cl.$^7$ ........................... B60R 22/08; B60R 22/35
(52) U.S. Cl. .................... 280/803; 280/801.1; 180/268; 180/271
(58) Field of Search .................. 180/268, 271; 280/801.1, 803

(56) References Cited

U.S. PATENT DOCUMENTS

| | | | | |
|---|---|---|---|---|
| 4,209,186 A | * | 6/1980 | Close | 280/803 |
| 4,817,754 A | * | 4/1989 | Muramoto | 180/268 |
| 5,026,093 A | * | 6/1991 | Nishikaji | 280/807 |
| 5,044,459 A | | 9/1991 | Nishikaji | |

| | | | |
|---|---|---|---|
| 6,698,795 B2 | * | 3/2004 | Enomoto et al. ........... 280/808 |
| 6,824,167 B2 | * | 11/2004 | Nishimoto et al. ....... 280/801.2 |

FOREIGN PATENT DOCUMENTS

| | | | |
|---|---|---|---|
| EP | 1-336-539 A1 | | 8/2003 |
| JP | 63-269756 | * | 11/1988 |
| JP | 2-117455 A | | 5/1990 |
| JP | 2-256547 | * | 10/1990 |
| JP | 2001-138864 A | | 5/2001 |
| JP | 2001-138864 | | 1/2005 |

* cited by examiner

Primary Examiner—Paul N. Dickson
Assistant Examiner—George D. Spisich
(74) Attorney, Agent, or Firm—Nixon Peabody LLP; Donald R. Studebaker

(57) ABSTRACT

A seatbelt system for a front seat of a vehicle having such a double door that a front door (2) and a rear door (3) open outwardly forward and rearward, respectively, to form an uninterrupted doorway (14) to a passenger compartment (A) and the front door (2) overlaps the rear door from the outside so as to allow the rear door (3) to open and close while the front door is open comprises a retractor (28) installed in the rear door (3) and retracting a seatbelt (27) therein, a seatbelt lock mechanism (37) operative to lock the seatbelt (27) when the seatbelt (27) attains a predetermined acceleration, and a lock canceling mechanism (38) operative to put the seatbelt lock mechanism (37) inoperative when activated, The seatbelt system activates the lock canceling mechanism (38) to put the seatbelt lock mechanism (37) inoperative when the seatbelt (27) is unbuckled while the front door and/or the rear door is open or not properly closed and deactivates the lock canceling mechanism (38) to put the seatbelt lock mechanism (37) operative when the seatbelt (27) is buckled up while the front door and/or the rear door is open or not properly closed.

16 Claims, 12 Drawing Sheets

FRONT SEATBELT SYSTEM FOR VEHICLE

BACKGROUND OF THE INVENTION

1. Field of the Invention

The present invention relates to a front seatbelt system for a vehicle having a double door construction in which a front door at its rear end overlaps a rear door from the outside of the vehicle and allows the rear door to open and close only while the front door remains open.

2. Description of Related Art

Front seatbelt systems of this kind are known from, for example, Japanese Unexamined Patent Publication Nos. 2-117455 and 2001-138864. The front seatbelt system disclosed in Japanese Unexamined Patent Publication No 2001-138864 is adapted to a vehicle having a double door construction in which front and rear doors open outwardly forward and rearward, respectively to form a single uninterrupted doorway to a passenger compartment, and more particularly, to front and rear seats and the front door at its rear end overlaps the rear door so as to allow the rear door to open and close only while the front door remains open. The front seatbelt system includes a seatbelt retractor installed to the rear door.

The front seatbelt system disclosed in Japanese Unexamined Patent Publication No 2-117455 is installed to a vehicle having a double door construction in which front and rear doors are pivotally mounted to front and rear hinge pillars, respectively, and each door opens and closes previous to the other. The front seatbelt system includes a seatbelt retractor installed within the rear door and having a seatbelt lock mechanism operative to lock the front seatbelt when the front seatbelt attains a specified acceleration and a lock canceling mechanism operative to put the seatbelt lock mechanism operative to lock the front seatbelt while the rear door is open with the aim of preventing a passenger sitting on the front seat from being restrained or fastened tightly in excess.

It is conceivably found to be useful for the front seatbelt system with the seatbelt retractor installed within the rear door of the double door construction to incorporate the seatbelt lock mechanism and the lock canceling mechanism therein, however, the seatbelt lock mechanism is always put inoperative while the rear door is open. In consequence, if the vehicle is driven with the front seatbelt buckled up but with the rear door not properly closed, it is impossible to restrain or secure a passenger sitting on the front seat tightly with the front seatbelt upon an occurrence of a collision of the vehicle.

SUMMARY OF THE INVENTION

It is therefore an object of the present invention to provide a front seatbelt system for a vehicle that prevents a front seatbelt from being locked while a door is open.

It is another object of the present invention to provide a front seatbelt system for a vehicle that prevents a seatbelt lock mechanism from being put inoperative even if a door is not properly closed while the front seatbelt is buckled up, thereby restraining or securing an front seat passenger tightly against a front seat for safety upon an occurrence of a collision during driving with the door not properly closed.

The foregoing objects of the present invention are accomplished by a front seatbelt system for a vehicle equipped with a double door construction in which a front door and a rear door overlapped by an rear end of the front door from the outside of the vehicle open outwardly forward and rearward, respectively, to form a single uninterrupted doorway opening to a passenger compartment of the vehicle and the front door allows the rear door to open and close while the front door is open comprises a retractor installed in the rear door and retracting a front seatbelt therein, seatbelt lock means for locking the front seatbelt when the front seatbelt attains a predetermined acceleration, lock canceling means for putting the seatbelt lock means inoperative when activated, door detection means for detecting whether at least either one of the front and rear doors is open, seatbelt detection means for detecting whether the front seatbelt is unbuckled. The front seatbelt system includes control means such as comprising a CPU that activates the lock canceling means to put the seatbelt lock means inoperative when the seatbelt detection means detects the front seatbelt that is unbuckled while the door detection means detects at least either one of the front and rear doors that is open and deactivates the lock canceling means to put the seatbelt lock means operative when the seatbelt detection means detects the front seatbelt that is buckled up while the door detection means detects at least either one of the front and rear doors that is open.

According to the front seatbelt system, the lock canceling means is activated to put the seatbelt lock means inoperative when the front seatbelt is undone while at least either one of the front and rear doors is open or not properly closed and deactivated to put the seatbelt lock means operative when the front seatbelt is buckled up while at least either one of the front and rear doors is open. Therefore, when at least either one of the front and rear doors is open, the front seatbelt is prevented from being locked or tightened while the front seatbelt is undone and is put ready to be locked or tightened while it is buckled up, so that the seatbelt system assures front seat passenger's safety upon an occurrence of a collision even if the vehicle is running with the front and/or rear doors not properly closed.

The lock canceling means may be activated to put the seatbelt lock means inoperative when a vehicle speed is lower than a predetermined speed, this indicates that the vehicle parks or is coming to a halt, even when the seatbelt is buckled up while at least either one of the front and rear doors is open or not properly closed. The seatbelt system puts the lock canceling means to remain activated only for a minimum length of service required.

It is preferred to employ the lock canceling means consisting of electrically operated means such as a solenoid that is excited with electric power from an in-vehicle battery to put the seatbelt lock means. In this case, the electrically operated lock canceling means may be released to put the seatbelt lock means operative after a lapse of a predetermined time from a point of time at which the electrically operated lock canceling means is energized. Even though the in-vehicle battery is used to energize the electrically operated lock canceling means, the front seatbelt system is less burdensome for the battery without disregard to front seat passenger's safety because of the excitation of the electrically operated lock canceling means for the predetermined time only.

However, the electrically operated lock canceling means may be continuously excited even after a lapse of the predetermined time while the engine is in operation. This is because the battery is so sufficiently charged by the engine in operation as to be prevented from going flat. Accordingly, the front seatbelt system assures front seat passenger's safety without disregard to burdensome for the battery in spite of continuous excitation of the electrically operated lock canceling means beyond the predetermined time.

Further, the electrically operated lock canceling means may be continuously excited even after a lapse of the predetermined time while the battery has a power voltage higher than a predetermined voltage. Since the electrically operated lock canceling means remains excited even after a lapse of the predetermined time as long as the battery can afford to consume power, the front seatbelt system assures front seat passenger's safety without disregard to burdensome for the battery.

Alternatively, the lock canceling means may be continuously activated even after a lapse of the predetermined time when the vehicle is running at a speed higher than a predetermined speed while at least either one of the front and rear doors is open and the seatbelt is undone. The seatbelt system activates the lock canceling means to put the lock means operative while the vehicle is running even if the seatbelt detection means fails to operate. Therefore, the seatbelt system assures front seat passenger's safety upon an occurrence of a collision even if the seatbelt detection means fails to operate.

According to another aspect of the present invention, a front seatbelt system is provided with an electrically operated lock canceling means comprising an electric power supply means, the door switch means disposed in series to the electrically operated lock canceling means in the electric power supply means and operative to trigger electric power supply to the electrically operated lock canceling means when the door switch means detects that at least either one of the front and rear doors is open, and seatbelt switch means disposed in series to the electrically operated lock canceling means and the door switch means in the electric power supply means and operative to put the electric power supply means inactive when the front seatbelt is undone and to put the electric power supply means active when the front seatbelt is buckled up. The electric power supply means interrupts electric power supply to the electrically operated means after a lapse of a predetermined time from a point of time at which the electric power supply is triggered. The door switch means comprises door switches, at least one for each door that turns OFF when the door closes. The seatbelt switch means comprises a buckle switch operative to turn OFF when the seatbelt is buckled up.

The seatbelt system performs excitation and release of the electrically operated lock canceling means by a hardware configuration only. Further, the seatbelt system releases the electrically operated lock canceling means to put the seatbelt lock means operative when any one of the door switches and the buckle switch turns OFF, so that the seatbelt attains importance to front seat passenger's safety and gives priority to front seat passenger's safety.

BRIEF DESCRIPTION OF THE DRAWINGS

The above and other objects and features of the present invention will be understood from the following description of exemplified embodiments thereof when considering in conjunction with the accompanying drawings, wherein the same reference numerals have been used to denote the same steps in flowcharts or the same elements throughout the drawings, and in which.

DETAILED DESCRIPTION OF THE SPECIFIC EMBODIMENT

Figure 1:
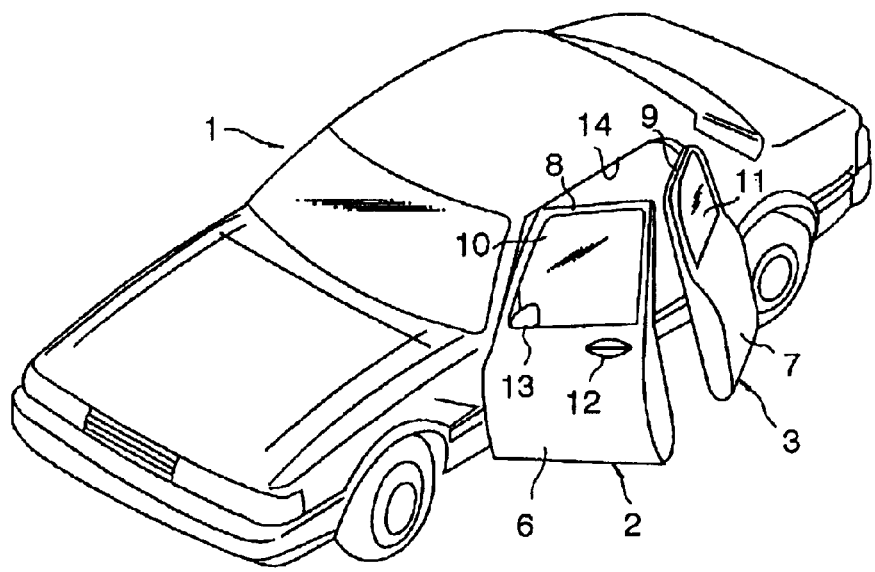
FIG. 1 is a perspective view of a vehicle having a double door construction and equipped with a front seatbelt system of the present invention.
Figure 2:
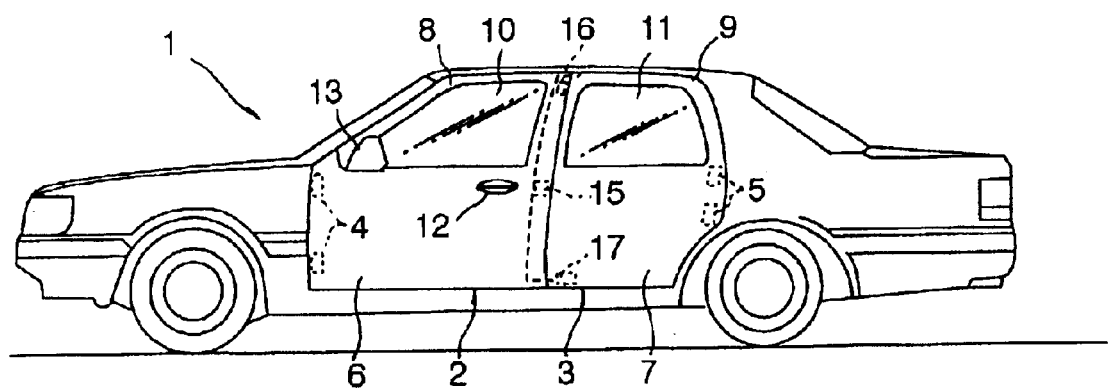
FIG. 2 is a side view of the vehicle shown in FIG. 2.

Referring to the accompanying drawings in detail, and, more particularly, to FIGS. 1 and 2 showing a vehicle 1 equipped with a front seatbelt system of the present invention, the vehicle 1 has a double door construction comprising a front door 2 and a rear door 3 that open outwardly forward and rearward, respectively, to form a single uninterrupted opening 14 as a doorway to a passenger compartment A (see FIG. 3) where front and rear seats (not shown) are arranged. The front door 2 comprise a door panel 6, a door sash 8 and a window glass 10 and is pivotally mounted at its front end on front hinges 4 to open outwardly forward. The rear door 3 comprises a door panel 7, a door sash 9 and a window glass 11 and is pivotally mounted at its rear end on rear hinges 5 to open outwardly rearward. Each of the front and rear doors 2 and 3 is equipped with a side impact bar (not shown) installed therein. The front door 2 is provided with an external door handle 12 for opening and closing the front door 2 and a door mirror 13 for checking the traffic behind. A similar pair of doors (not shown) are provided on the opposite side of the vehicle 1.

The double door construction of this embodiment is adapted so that the front door 2 opens in preference to the rear door 3 and allows the rear door 3 to open and close only while the front door 2 is open. Specifically, as shown in FIG. 2, the front door 2 at its rear end overlaps partly the rear door 3 from the outside of the vehicle. The front and rear doors 2 and 3 open to form the single uninterrupted opening 14, namely a doorway to front and rear seats, of the vehicle 1. The rear door 3 is adapted to open with a slight slop in light of body design. The front door 2 at its rear end is provided with a latch member 15 that is brought into engagement with a striker 15S (see FIG. 3) secured to a front end of the rear door 3 for locking the front door 2 when the front door 2 is closed. The rear door 3 at its upper and lower front ends is provided with upper and lower latch members 16 and 17 that are brought into engagement with strikers (not shown) secured to rigid parts of the vehicle 1 along the uninterrupted opening 14 for locking the rear door 3 on the inside when the rear door 3 is closed.

Figure 3:
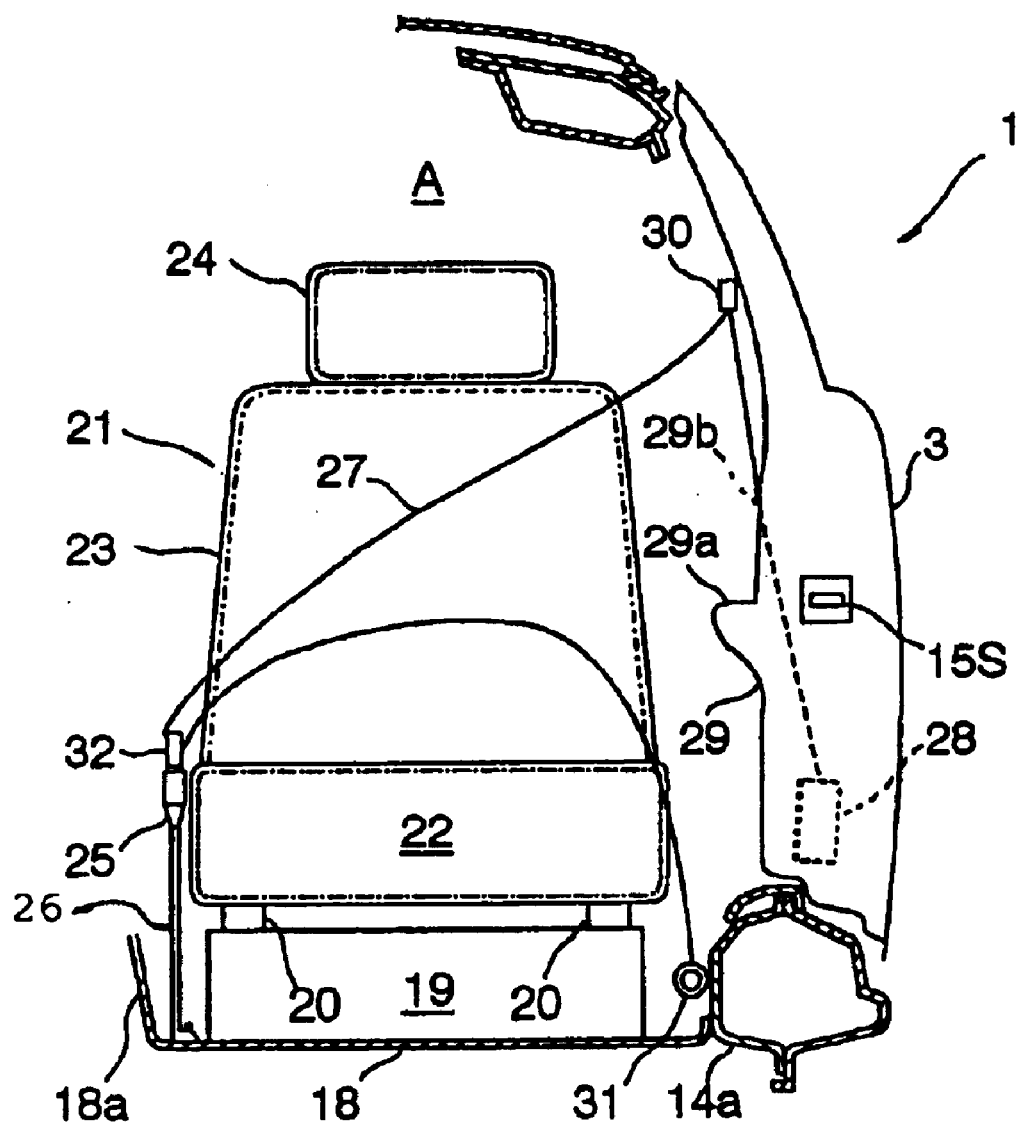
FIG. 3 is a front view of a front seat equipped with a seatbelt system according to an embodiment of the present invention.

Referring to FIG. 3, a front seat 21 is installed on a floor panel 18 in the passenger compartment A. Specifically, the front seat 12 is mounted on parallel rails 20 so as to slide back and forth. The rails 20 are supported on a retainer bracket 19 secure to the floor panel 18. The front seat 21, which comprises a seat cushion 22, a seatback 23 and a head restraint 24, is equipped with a front seatbelt system for restraining a passenger sitting on the front seat 21. The front seatbelt system comprises a seatbelt 27, a retractor 28, a shoulder anchor 30, a buckle tongue 32 and a buckle 25. The seatbelt 27 is connected to the retractor 28 disposed in a front lower part of the inside of the rear door 3 at one of opposite ends thereof and to a retainer member 31 movable back and forth along a lower shill 14a of the uninterrupted opening 14 at another end thereof. The retractor 28 is disposed in a front lower part of the inside of the rear door 3 and retracts the seatbelt 27 therein. The front lower part of the rear door 3 where the retractor 28 is installed is constructed so rigid as to serve for a center pillar and provided with an inside door trim panel 29 having an arm rest 29a formed as an integral part thereof. The buckle 25, that is disposed between and in vicinity to the seat cushion 22 and a floor tunnel 18a, is held by a bracket 26 secured to the floor panel 18 and supported by the seat cushion 22 through a stalk (not shown). The shoulder anchor 30 is secured to an upper half part of the rear door 3 corresponding in position to the head restraint 24 from the inside of the vehicle 1. The seatbelt 27 is pulled out into the passenger compartment from the refractor 28 A through a slot 29b formed in the door trim panel 29 above the arm rest 29a and hung on the shoulder anchor 30. The buckle tongue 32 is loosely mounted on the seatbelt 27 for position adjustment and is releasably latched by the buckle 25 to fasten the seatbelt 27 so as to restrain a passenger sitting on the front seat 21. A similar set of front seatbelt system (not shown) is provided for a front seat on the opposite side of the vehicle 1.

Figure 4:
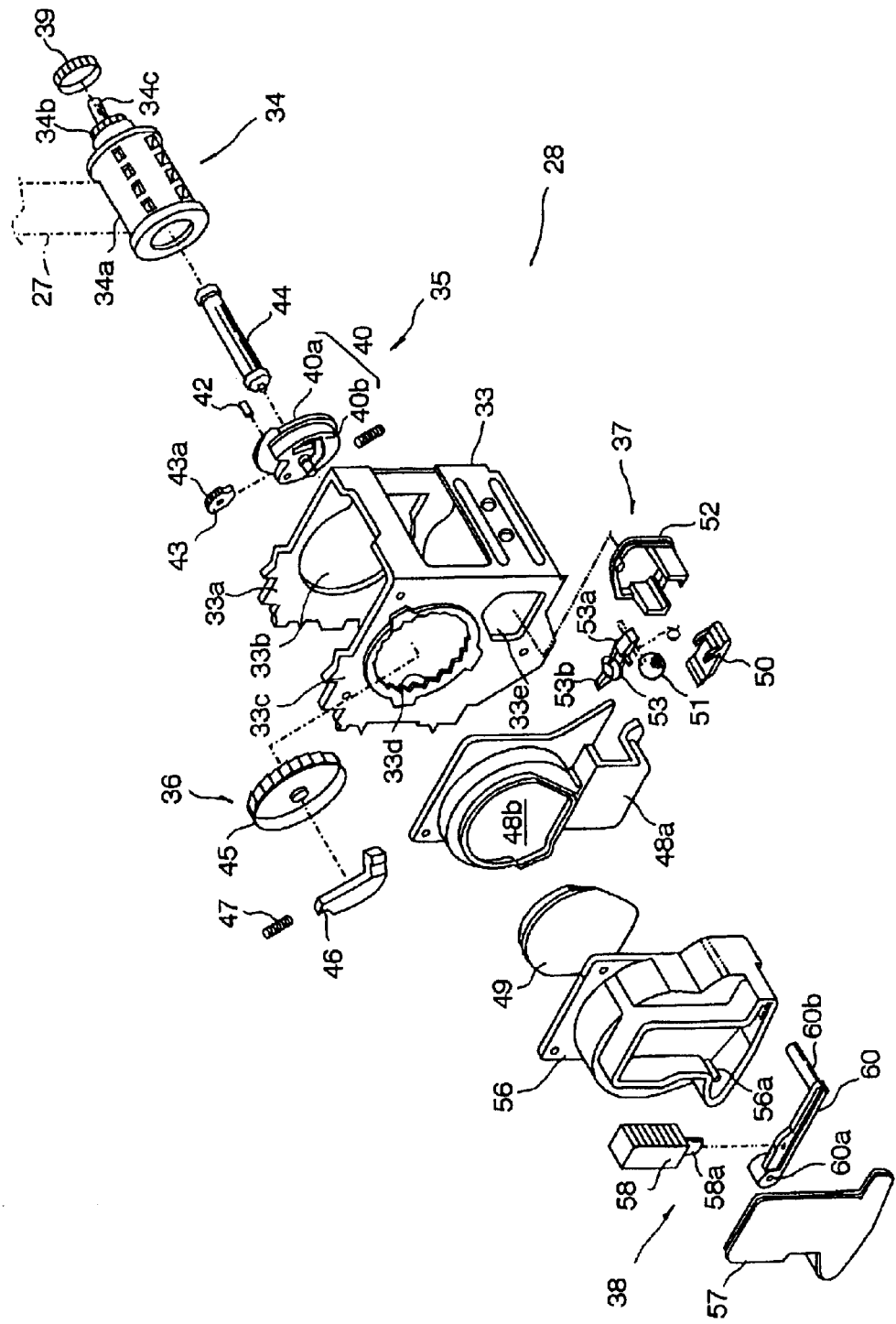
FIG. 4 is an exploded perspective view of a retractor of the seatbelt system.

Referring to FIG. 4 showing details of the retractor 28 for retracting the seatbelt 27 therein, the retractor 28 comprises a generally U-shaped retractor frame 33, a take-up reassembly 34 operative to wind up the seatbelt 27 thereon, a latch mechanism 35 operative to latch and prevent the spool drum 34a from rotating in an unwinding direction in which the seatbelt 27 is pulled out from the retractor 28 upon an emergency lock of the spool drum 34a, an emergency latch actuator 36 operative to actuate the latch mechanism 35 upon an occurrence of an emergency such as a collision of the vehicle, a seatbelt lock mechanism 37 operative to lock the seatbelt 27 when the seatbelt 27 attains a specified acceleration, and a lock cancellation mechanism 38 operative to activate and release the seatbelt lock mechanism 37.

The U-shaped retractor frame 33, in which the take-up reel assembly 34 is installed, has a front wall 33a with a hole 33b and a rear wall 33c with a ratchet hole 33d and a generally rectangular opening 33e. The reel assembly 34 comprises a spool drum 34a disposed within the retractor frame 33, a spline-toothed shank 34b and a shaft 34c which are preferably formed as one integral piece. The shaft 34c is provided with a return spring (not shown) so as to be forced in a winding direction in which the seatbelt 27 is wound up. The spline-toothed shank 34b is engaged by an annular pinion 39 forming a part of a pretensioning mechanism (not shown). The pretensioning mechanism is known in various forms and may take any form well known to those skilled in the art such as disclosed in, for example, Japanese Unexamined Patent Publication Nos. 2002-151077 and 2001-233172.

The latch mechanism 35, that is disposed within the ratchet hole 33d formed in the rear wall 33c of the retractor frame 33 and is rigidly connected to the reel assembly 34 by a torsion bar 44, comprises a latch disk assembly 40 having a latch base 40a and a latch disk 40b and a pawl 43 with external teeth 43a. The pawl 43 is pivotally mounted on a joint pin 42 secured to the latch disk 41. The latch mechanism 35 is located so that the pawl 43 brings the external teeth 43a into engagement with the internal teeth of the ratchet hole 33d when it rotates and is retained by the internal teeth of the ratchet hole 33d. When the pawl 43 engages with and is retained by the internal teeth of the ratchet hole 33d, it latches the latch disk assembly 40, so as to exert its reaction force on the latch base 40a. At this moment, while the spool drum 34a forced in the unwinding direction by the seatbelt 27 is restrained from further rotation, an impact load applied to the latch disk assembly 40 by the reel assembly 34 is absorbed by the torsion bar 44.

The emergency latch actuator 36 is located within a retainer housing 48 having a generally circular hole 48b that is screwed to the rear wall of the retractor frame 33 and closed by a rear cover 49 and pivotally mounted on the latch disk assembly 40 for rotation relative to the latch disk assembly 40. The emergency latch actuator 36 comprises a ratchet wheel 45 pivotally mounted to the latch disk assembly 40, a fly wheel 46 pivotally mounted to the ratchet wheel 45 and a tension spring 47 mounted between the ratchet wheel 45 and the fly wheel 46.

The seatbelt lock mechanism 37 is installed in a housing 49 fitted in and secured to the opening 33e of the retractor frame 33 and covered by a lower housing extension 48a of the retainer housing 48. The seatbelt lock mechanism 37 comprises a sensor casing 50, a ball 51 serving as an inertial mass movably received in the sensor casing 50 and a latch lever 53 with a pivot shaft 53a and a pawl 53b formed as one integral piece. The latch lever 53 is pivotally mounted to the sensor casing 50 by the pivot shaft 53a. When the ball 51 moves in a cross direction and/or a longitudinal direction, the latch lever 53 is forced by the ball 51 to bring the pawl 53b into engagement with the latchet wheel 45, thereby latching the latch wheel 45 to prevent the spool drum 34a from rotation in the unwinding direction, and hence to prevent the seatbelt 27 from being further pulled out from the retractor 28. In this way, the seatbelt 27 is locked up upon an occurrence of an emergency such as a collision of the vehicle.

The lock canceling mechanism 38 is installed within a housing 56 closed by a rear cover 57. The lock canceling mechanism 38 comprise an electrically operated solenoid 58 having a plunger 58a and a lever 60 having a bushing 60a and an actuator pin 60b. The lever 60 at the bushing 60a is pivotally mounted on a pivot shaft 56a extending from the housing 56. The actuator pin 60b extends below the under side of the actuator lever 53. When the lock canceling mechanism 38 is activated, specifically when the solenoid 58 is exited, the plunger 58a protrudes and pushes the lever 60 down. As a result, the actuator pin 60b is turned in a clockwise direction as shown by an imaginary line a to bring the actuator lever 53 into a neutral position where the pawl 53b is isolated from the ball 51 and the ratchet wheel 54, so as thereby to put seatbelt lock mechanism 37 inoperative in spite of movement of the ball 51. In this way, while the lock canceling mechanism 38 remains activated, specifically when the solenoid 58 remains exited, the seatbelt lock mechanism 37 is always put inoperative. On the other hand, while the lock canceling mechanism 38 remains deactivated, specifically when the solenoid 58 remains released, the seatbelt lock mechanism 37 is always put operative so as to be ready for locking the seatbelt 27 being pulled out from the retractor 28 upon an occurrence of an emergency such as a collision.

The retractor 28 as well as other parts and mechanisms is known in structure and operation in various forms and may take any form well known to those skilled in the art such as disclosed in, for example, Japanese Unexamined Patent Publication Nos. 2002-151077 and 2001-233172.

Providing an overview of operation of the retractor 28, during ordinary driving, the latch mechanism 35 and the pretensioning mechanism are not activated and, therefore, the spool drum 34a remains forced in the winding direction by the return spring. When the seatbelt 27 is pulled out from the retractor 28, the spool drum 34a is rotated in the unwinding direction biasing the return spring. Upon an occurrence of a collision of the vehicle, the pretensioning mechanism is activated instantaneously to exert a strong circumferential torque on the torsion bar 44 in the winding direction, so that the spool drum 34a is turned through the torsion bar 44 to wind up the seatbelt 27 by a specified length. At approximately the same time, the emergency latch actuator 36 activates the latch mechanism 35 to prevent the latch base 40 from turning in the unwinding direction.

Figure 5:
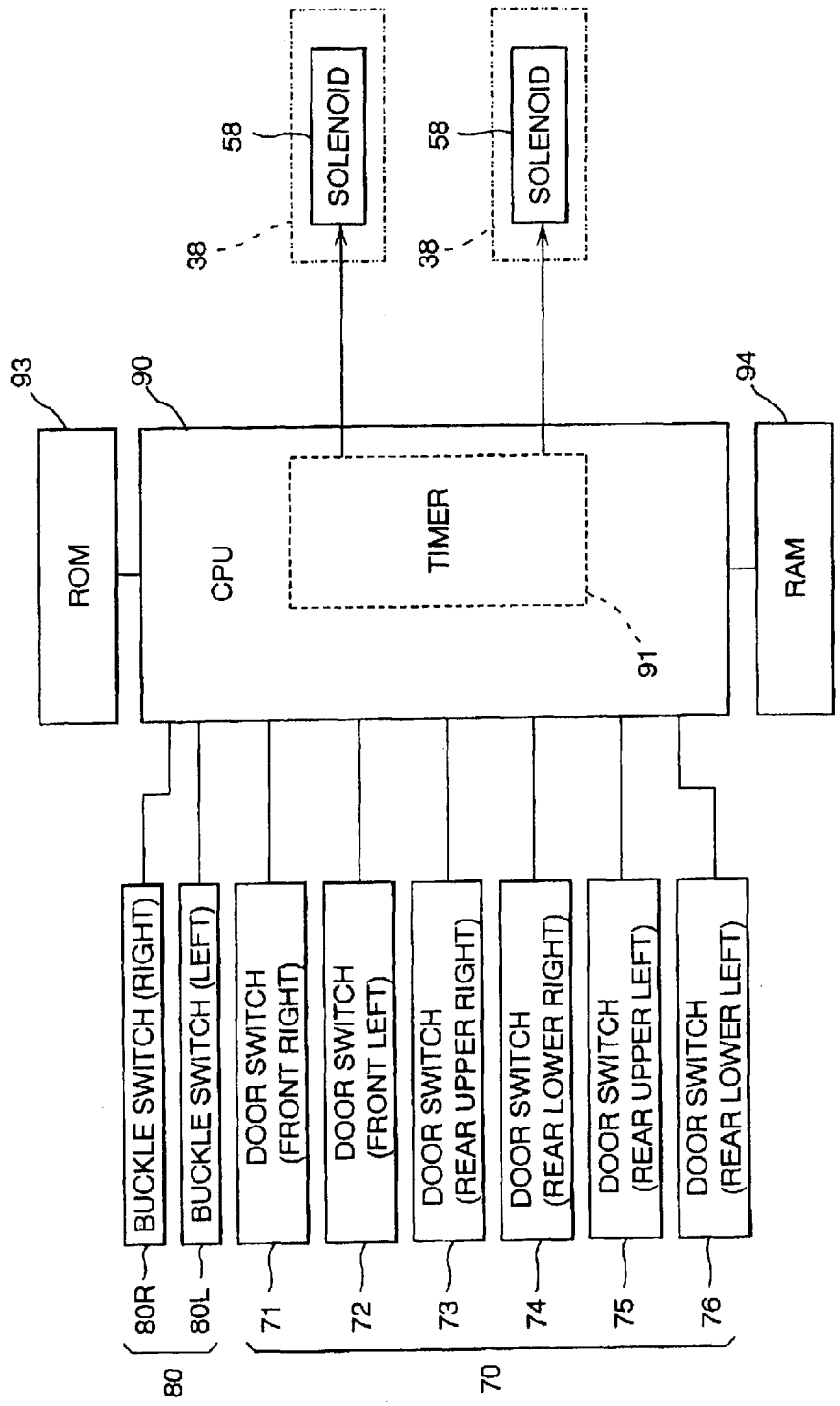
FIG. 5 is a block diagram illustrating a seatbelt control system of the front seatbelt system.

Referring to FIG. 5 showing a seatbelt lock control circuit for the front seatbelt system, the seatbelt lock control circuit comprises a control unit such as a CPU 90 including an internal timer 91, a ROM 93 and a RAM 94. The CPU 90 receives control signals from door detection switch means 70 and buckle switch means 80 and provides a lock cancellation signal for the lock canceling mechanism 38 of the front seatbelt system on the basis of the control signals. The door detection switch means 70 includes right and left door switches 71 and 72 for the right and left front doors 2, respectively, upper and lower door switches 73 and 74 for the right rear door 3, and upper and lower door switches 75 and 76 for the left rear door 3. The buckle switch means 80 includes right and left buckle switches 80R and 80L for right and left front seatbelt systems, respectively, Each of the door switches 71–76 turns ON to provide a control signal indicating that a door to which the door switch is installed is open when the door opens or is not properly closed. On the other hand, each of the buckle switches 80R and 80L turns ON to provide a control signal indicating that the seatbelt 27 of the front seatbelt system including the buckle switch is undone when the buckle tongue 32 is unbuckled or unlatched from the buckle 25. Absence of the control signal indicates that the buckle tongue 32 remains latched by the buckle 25 to keep the seatbelt 27 buckled up.

Figure 6:
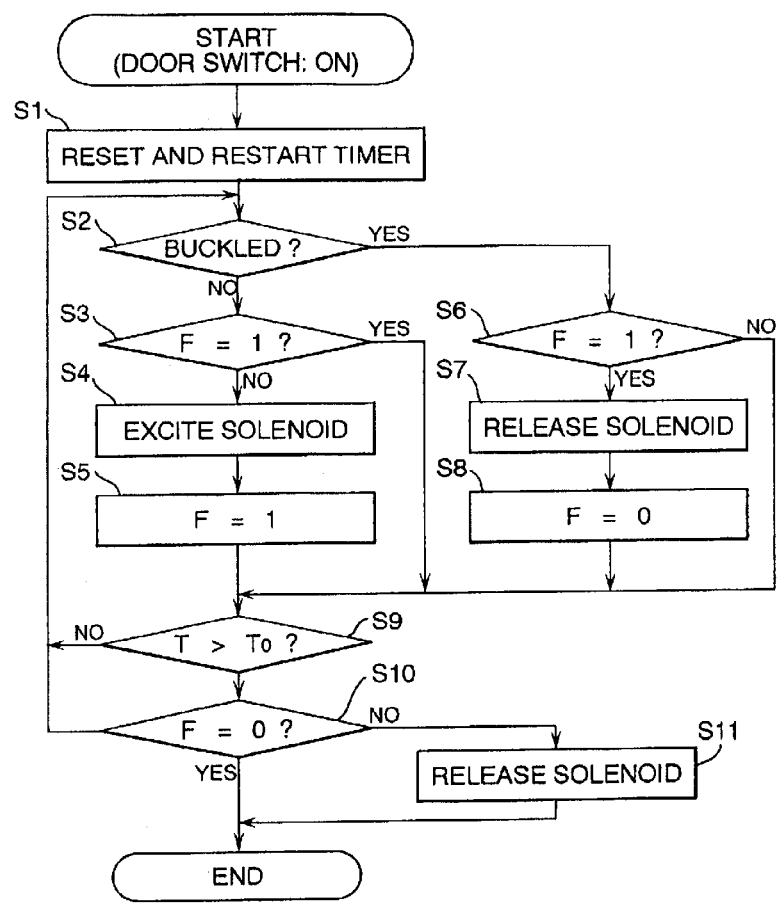
FIG. 6 is a flowchart illustrating seatbelt lock canceling control for the seatbelt control system shown in FIG. 5.

When the CPU 90 receives a control signal from at least one of the door switches 71–76, it executes programmed seatbelt lock control illustrated by a flowchart shown in FIG. 6 stored in a ROM 93. The CPU 90 provides an lock cancellation signal with which the solenoid 58 of the lock canceling mechanism 38 is excited to put the seatbelt lock mechanism 37 inoperative when receiving control signals from at least one of the door switches 71–76 and the buckle switch 80R or 80L and removes the lock cancellation signal when the control signal from the buckle switch 80R or 80L disappears even while receiving the control signals from at least one of the door switches 71–76. A RAM 94 stores data regarding a cancellation flag F that indicates that the solenoid 58 of the lock canceling mechanism 38 is in an excited state, and hence the seatbelt lock mechanism 37 is put inoperative, when it is up or in a state of 1 and that that the solenoid 58 of the lock canceling mechanism 38 is in a released state, and hence the seatbelt lock mechanism 37 is put operative when it is down or in a state of 0.

FIG. 6 is a flowchart illustrating the seatbelt lock control routine for a micro computer of the CPU 90. Although the following description is directed to the seatbelt system for the front left seat 21, much the same is true on the seatbelt system for the front right seat. The sequence logic commences when the CPU 90 receives control signals from at least one of the door switches 71–76, in other words, when at least one of the front and rear doors 2 and 3 is open or not properly closed. When the sequence logic commences and control proceeds to step S1 where the internal timer 91 is reset and immediately restarts to count time T, for example 60 minutes. Subsequently, a judgment is made in step S2 as to whether the seatbelts 27 is buckled up. When the answer is negative (NO), i.e. when a control signal from the buckle switch 80L is present resulting from that the seatbelt 27 is undone or unbuckled, then, another judgment is made in step S3 as to whether the lock cancellation flag F is up or in the state of 1. When the answer is negative (NO), i.e. when the solenoid 58 of the lock canceling mechanism 38 remains released, then, the CPU 90 provides a lock cancellation signal to excite the solenoid 58 of the lock canceling mechanism 38 in step S4. As a result, the seatbelt lock mechanism 37 is put inoperative. Subsequently, after the CPU 90 has changed the lock cancellation flag F to the state of 1 in step S5, the sequence logic proceeds to step S9 for a judgment as to a time T.

When it is judged in step S3 that the lock cancellation flag F is up or in the state of 1, the CPU 90 keeps the solenoid 58 of the lock canceling mechanism 38 excited and the lock cancellation flag F in the state of 1. In consequence, the seatbelt lock mechanism 37 remains inoperative. Then, the sequence logic proceeds directly to step S9 for a judgment as to a time T.

On the other hand, when the answer to the judgment as to the seatbelt 27 made in step S2 is affirmative (YES), in other words, when a control signal from the buckle switch 80L is absent or disappears resulting from that the seatbelt 27 is buckled up, then, another judgment is made in step S6 as to whether the lock cancellation flag F is up or in the state of 1. When the answer is affirmative (YES), i.e. when the solenoid 58 of the lock canceling mechanism 38 remains, then, the CPU 90 removes the lock cancellation signal to release the solenoid 58 of the lock canceling mechanism 38 in step S7. As a result, the seatbelt lock mechanism 37 is put operative. Subsequently, after the CPU 90 has changed the lock cancellation flag F to the state of 0 in step S8, the sequence logic proceeds to step S9 for a judgment as to a time T.

When it is judged in step S6 that the lock cancellation flag F is down or in the state of 0, the CPU 90 keeps the solenoid 58 of the lock canceling mechanism 38 released and the lock cancellation flag F in the state of 0. In consequence, the seatbelt lock mechanism 37 remains operative. Then, the sequence logic proceeds directly to step S9 for a judgment as to a time T.

The preceding steps S2–S8 are repeated until it is judged that a predetermined time $T_0$, for example 60 minutes, has passed in step S9. After having waited for a lapse of the predetermined time $T_0$ in step S9, a further judgment is made in step S10 as to whether the lock cancellation flag F is down or in the state of 0. The sequence logic is brought to completion directly when the answer is affirmative (YES), this indicates that the solenoid 58 of the lock canceling mechanism 38 has been released, and hence the seatbelt lock mechanism 37 has been put operative, or otherwise, after having released the solenoid 58 of the lock canceling mechanism 38 to put the seatbelt lock mechanism 37 operative in step S11 when the answer is negative (NO) in step S10.

According to the front seatbelt system for a vehicle having a double door construction in which the front door 2 and the rear door 3 open outwardly forward and rearward, respectively, to form the single uninterrupted opening 14 as a doorway to the front and rear seats, the control unit, i.e. the CPU 90, excites the solenoid 58 of the lock canceling mechanism 38 to put the seatbelt lock mechanism 37 inoperative while at least one of the front and rear doors 2 and 3 remain open or is not properly closed and the seatbelt 27 remains undone and, on the other hand, releases the solenoid 58 of the lock canceling mechanism 38 to put the seatbelt lock mechanism 37 operative while at least one of the front and rear doors 2 and 3 remains open or is not properly closed and the seatbelt 27 has been buckled up to restrain the passenger on the front seat 21. Accordingly, while the front seatbelt system prevents the seatbelt 27 from being locked up when at least one of the front and rear doors 2 and 3 remains open or is not properly closed and the seatbelt 27 is undone and, however, puts the seatbelt 27 ready for an emergency lock even when at least one of the front and rear doors 2 and 3 opens while the seatbelt 27 is buckled up. This secures front seat passenger's safety upon an occurrence of a collision during driving with a door not properly closed. The control unit releases the solenoid 58 of the lock canceling mechanism 38 after a lapse of the predetermined time $T_0$ from the setout of excitation of the solenoid 58. Even though an in-vehicle battery is used to excite the solenoid 58 of the lock canceling mechanism 38, the front seatbelt system is less burdensome for the in-vehicle battery because of excitation of the solenoid 58 of the lock canceling mechanism 38 for the predetermined time $T_0$ only while it secures front seat passenger's safety.

Figure 7:
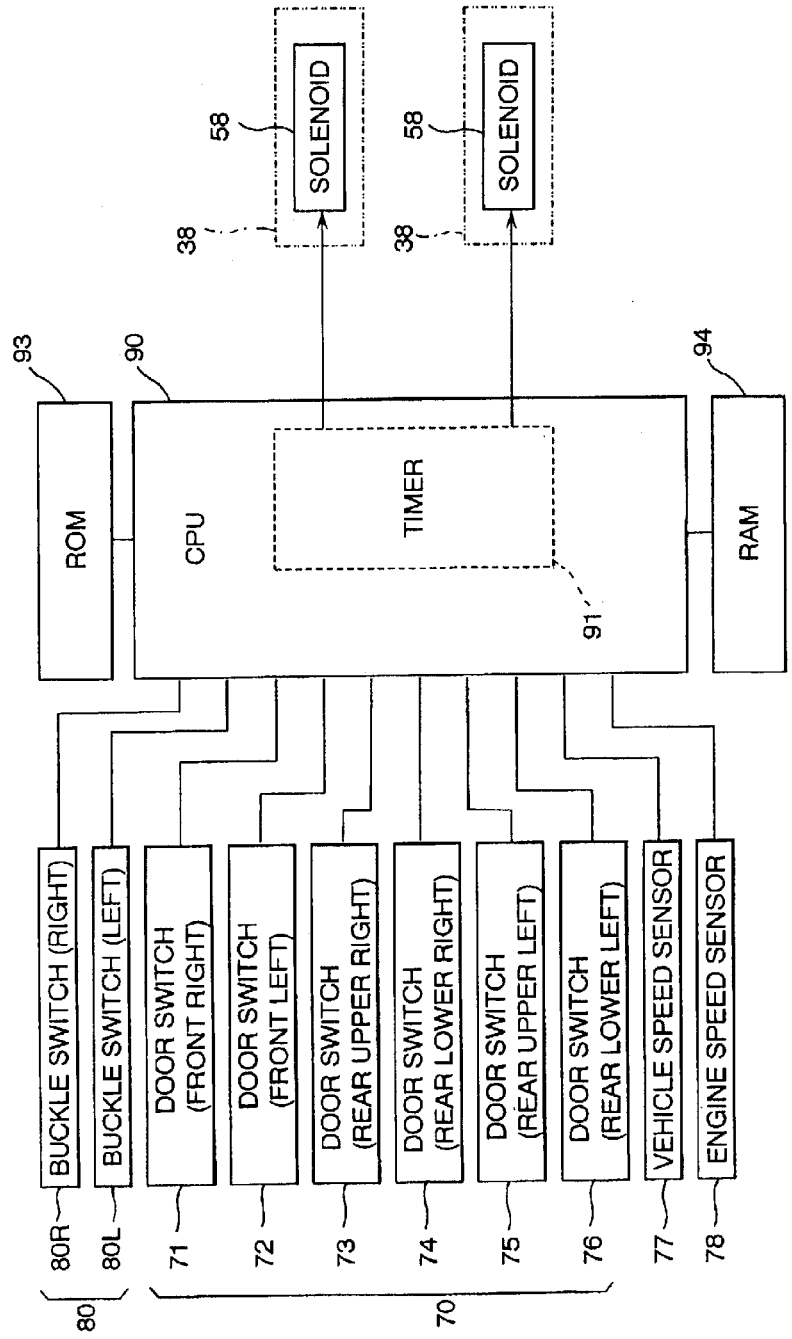
FIG. 7 is a block diagram illustrating another seatbelt control system of the front seatbelt system.
Figure 8:
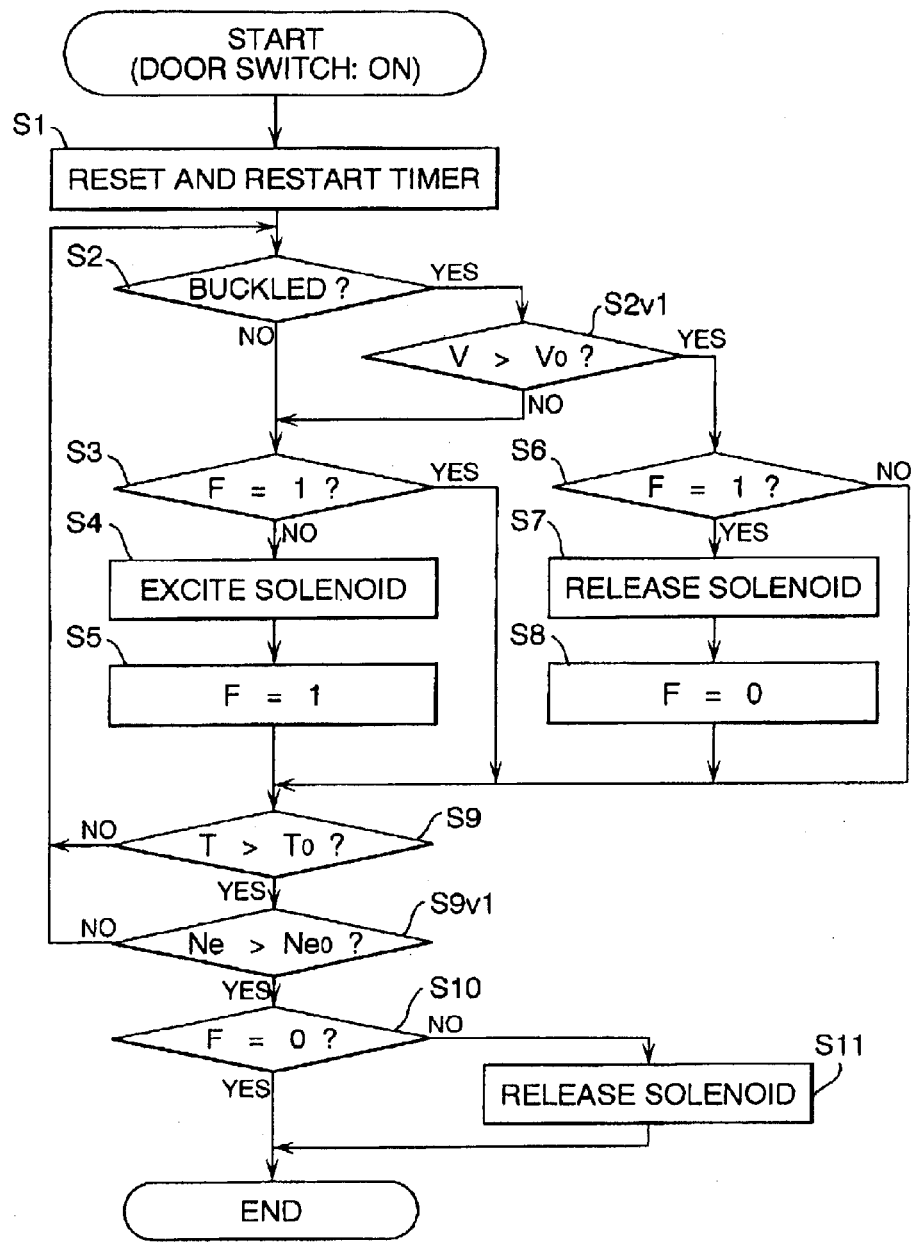
FIG. 8 is a flowchart illustrating seatbelt lock canceling control for the other seatbelt control system shown in FIG. 7.

FIGS. 7 and 8 schematically show a front seatbelt system according to another embodiment of the present invention that has the same mechanisms as the front seatbelt system shown in FIGS. 1 through 4 but is different in condition for excitation of the solenoid 58 of the lock canceling mechanism 38. As shown in FIG. 7, a control circuit for the front seatbelt system has sensors, namely a vehicle speed sensor 77 and an engine sped sensor 78, in addition to those of the control circuit of the previous embodiment shown in FIG. 5. The vehicle speed sensor 77 detects a vehicle speed V and provides a signal representative the vehicle speed V. The engine speed sensor 78 detects an engine speed Ne and provides a signal representative the engine speed Ne. The CPU 90 excites the solenoid 58 of the lock canceling mechanism 38 to put the seatbelt lock mechanism 37 inoperative when the vehicle speed V is lower than a predetermined speed $V_0$ of, for example, 5 km/h, or substantially stops or is stopping (the vehicle speed is 0 km/h or approximately 0 km/h) and keeps excitation of the solenoid 58 of the lock canceling mechanism 38 while the engine speed Ne remains equal to or lower than a predetermined speed $Ne_0$ even after a lapse of the predetermined time $T_0$ from the setout of excitation of the solenoid 58. In this instance, it is preferred to employ a predetermined speed $Ne_0$ higher than an idling engine speed ranging from approximately 650 rpm to approximately 700 rpm.

Specifically, as shown in FIG. 8 illustrating a flowchart of programmed seatbelt lock control routine for a microcomputer of the CPU 90, the sequence logic commences when the CPU 90 receives a control signal from at least one of the door switches 71–76, i.e. when at least one of the front and rear doors 2 and 3 is open or not properly closed. When the sequence logic commences and control proceeds to step S1 where the internal timer 91 is reset and immediately restarts to count a time T. Subsequently, a judgment is made in step S2 as to whether the front seatbelts 27 has been buckled up. When the answer is negative (NO), i.e. when the seatbelt 27 is undone or unbuckled, then, another judgment is made in step S3 as to whether a lock cancellation flag F is up or in the state of 1. When the answer is negative (NO), i.e. when the solenoid 58 of the lock cancellation mechanism 38 remains released, then, the CPU 90 provides a lock cancellation signal to excite the solenoid 58 of the lock canceling mechanism 38, thereby putting the seatbelt lock mechanism 37 inoperative in step S4. Subsequently, after the CPU 90 has changed the lock cancellation flag F to the state of 1 in step S5, the sequence logic proceeds to step S9 for a judgment as to a time T.

When it is judged in step S3 that the lock cancellation flag F is up or in the state of 1, the CPU 90 keeps the solenoid 58 of the lock canceling mechanism 38 excited and the lock cancellation flag F in the state of 1. In consequence, the seatbelt lock mechanism 37 remains inoperative. Then, the sequence logic proceeds to step S9 for a judgment as to a time T.

On the other hand, when the answer to the judgment as to the seatbelt 27 made in step S2 is affirmative (YES), in other words, when the seatbelt 27 has been buckled up, then, another judgment is made in step S2$\nu$1 as to whether the vehicle speed V is higher than the predetermined speed $V_0$. Only when the vehicle is running at a speed V higher than the predetermined speed $V_0$, the sequence logic proceeds to step S6 where a judgment is made as to whether a lock cancellation flag F is up or in the state of 1. When the answer is affirmative (YES), i.e. when the solenoid 58 of the lock canceling mechanism 38 remains excited, then, the CPU 90 removes a lock cancellation signal to release the solenoid 58 of the lock canceling mechanism 38 in step S7. As a result, the seatbelt lock mechanism 37 is put operative. Subsequently, after the CPU 90 has changed the lock cancellation flag F to the state of 0 in step S8, the sequence logic proceeds to step S9 for a judgment as to a time T.

When it is judged in step S6 that the lock cancellation flag F is down or in the state of 0, the CPU 90 keeps the solenoid 58 of the lock canceling mechanism 38 released and the lock cancellation flag F in the state of 0. In consequence, the seatbelt lock mechanism 37 remains operative. Then, the sequence logic proceeds directly to step S9 for a judgment as to a time T. The preceding steps S2–S8 including step S2$\nu$1 are repeated until it is judged that the predetermined time $T_0$ has passed in step S9.

After having waited for a lapse of the predetermined time To in step S9, another judgment is made in step S9$\nu$1 as to whether the engine speed Ne is higher than the predetermined speed $Ne_0$. The preceding steps S2–S9 including step S2$\nu$1 are repeated until the engine speed Ne has become below the predetermined speed $Ne_0$. After having waited for attainment of the predetermined speed $Ne_0$, a further judgment is made in step S10 as to whether the lock cancellation flag F is down or in the state of 0. The sequence logic is brought to completion directly when the answer is affirmative (YES), or otherwise after having released the solenoid 58 of the lock canceling mechanism 38 to put the seatbelt lock mechanism 37 operative in step S11 when the answer is negative (NO).

According to the front seatbelt system described above, the control unit, i.e. the CPU 90, activates the lock canceling mechanism 38 to put the seatbelt lock mechanism 37 inoperative when it is fulfilled that at least one of the front and rear doors 2 and 3 is open or not properly closed, the seatbelt 27 is buckled up and the vehicle is running at a speed lower than the predetermined speed $V_0$, or otherwise stops or is stopping. This makes it possible to activate the lock canceling mechanism 38 only for a minimum length of service required. In addition, the control unit continuously keeps excitation of the solenoid 58 of the lock canceling mechanism 38 during operation of the engine with a speed higher than the predetermined speed $Ne_0$ even after a lapse of the predetermined time $T_0$. In this instance, the battery is so sufficiently charged by the engine in operation as to be prevented from going flat although the solenoid 58 of the lock canceling mechanism 38 is continuously excited after a lapse of the predetermined time $T_0$. This secures front seat passenger's safety upon an occurrence of a collision admitting that the front seatbelt system lightens the burden imposed on the battery.

Figure 9:
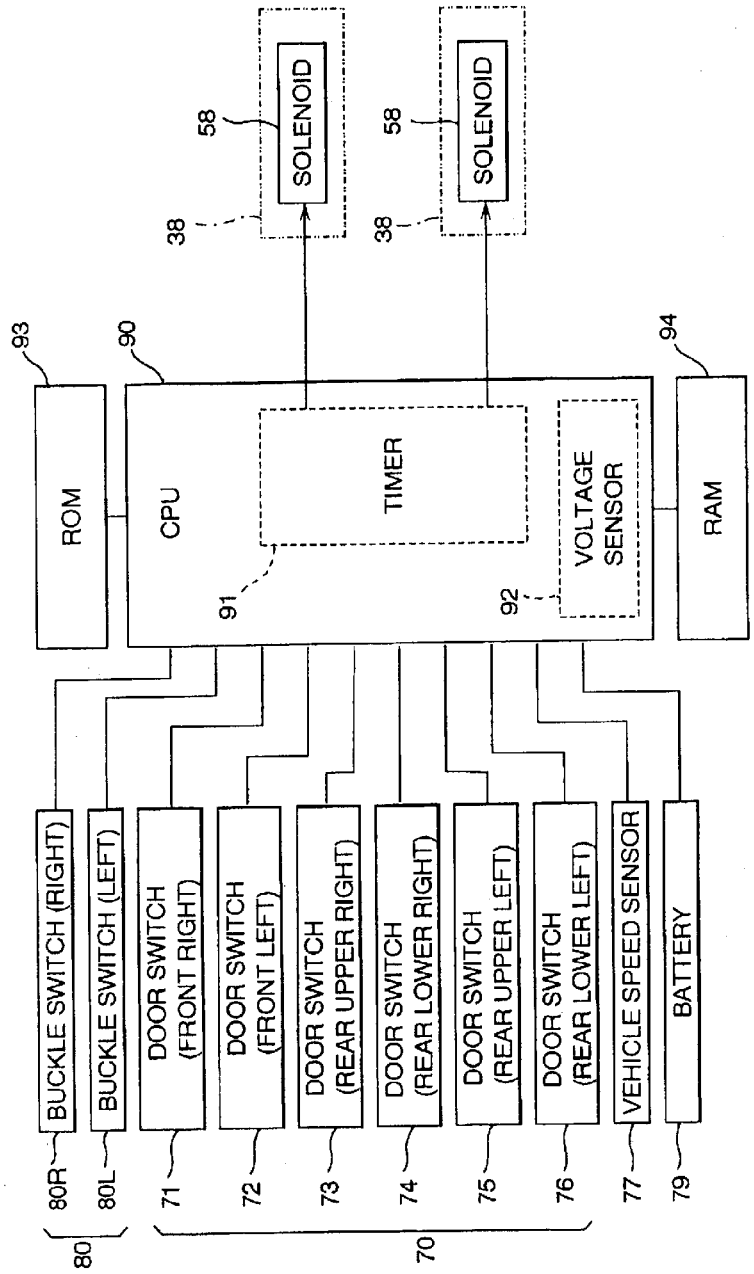
FIG. 9 is a block diagram illustrating still another seatbelt control system of the front seatbelt system.
Figure 10:
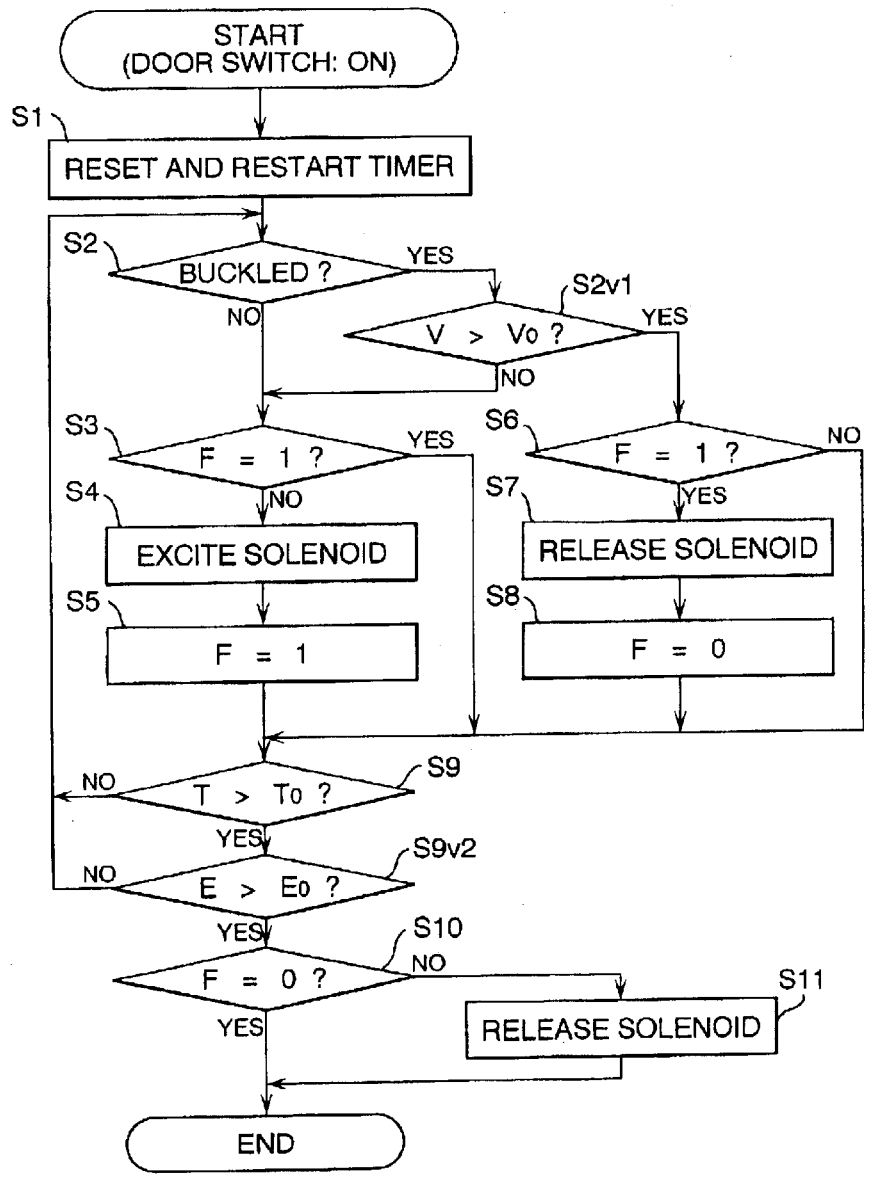
FIG. 10 is a flowchart illustrating seatbelt lock canceling control for the other seatbelt control system shown in FIG. 9.

FIGS. 9 and 10 schematically show a front seatbelt system according to still another embodiment of the present invention that has the same mechanisms as, but is different in condition for excitation of the solenoid 58 of the lock canceling mechanism 38, from the front seatbelt system shown in FIGS. 7 and 8. As shown in FIG. 9, a control unit, CPU 90, for the front seatbelt system includes a battery voltage sensor 92 therein in place of the engine speed sensor 78 of the previous embodiment shown in FIG. 7. The battery voltage sensor 92 detects a battery voltage E of a battery 79. The CPU 90 continuously keeps excitation of the solenoid 58 of the lock canceling mechanism 38 while the battery voltage E is higher than a predetermined voltage $E_0$, in other words, while the battery has sufficient power to spare, even after a lapse of the predetermined time $T_0$ from the setout of locking the seatbelt 27.

Specifically, as shown in FIG. 10 illustrating a flowchart of programmed seatbelt lock control routine for a microcomputer of the CPU 90, the sequence logic commences when the CPU 90 receives a control signal from at least one of the door switches 71–76, i.e. when at least one of the front and rear doors 2 and 3 is open or not properly closed. When the sequence logic commences and control proceeds to step S1 where the internal timer 91 is reset and immediately restarts to count a time T. Subsequently, a judgment is made in step S2 as to whether the front seatbelts 27 has been buckled up. When the answer is negative (NO), in other words, when the seatbelt 27 has been undone or unbuckled, then, another judgment is made in step S3 as to whether a lock cancellation flag F is up or in the state of 1. When the answer is negative (NO), i.e. when the solenoid 58 of the lock canceling mechanism 38 remains released, then, the CPU 90 provides a lock cancellation signal to excite the solenoid 58 of the lock canceling mechanism 38, thereby putting the seatbelt lock mechanism 37 inoperative in step S4. Subsequently, after the CPU 90 has changed the lock cancellation flag F to the state of 1 in step S5, the sequence logic proceeds to step S9 for a judgment as to a time T.

When it is judged in step S3 that the lock cancellation flag F is up or in the state of 1, the CPU 90 keeps the solenoid 58 of the lock canceling mechanism 38 excited and the lock cancellation flag F in the state of 1. In consequence, the seatbelt lock mechanism 37 remains inoperative. Then, the sequence logic proceeds to step S9 for a judgment as to a time T.

On the other hand, when the answer to the judgment as to the seatbelt 27 made in step S2 is affirmative (YES), in other words, when a control signal from the buckle switch 80L is absent or disappears resulting from that the seatbelt 27 is buckled up, then, another judgment is made in step S2v1 as to whether the vehicle speed V is higher than the predetermined speed $V_0$. Only when the vehicle is running at a speed V higher than the predetermined speed $V_0$, the sequence logic proceeds to step S6 where a judgment is made as to whether a lock cancellation flag F is up or in the state of 1. When the answer is affirmative (YES), i.e. when the solenoid 58 of the lock canceling mechanism 38 remains, then, the CPU 90 removes a lock cancellation signal to release the solenoid 58 of the lock canceling mechanism 38 in step S7. As a result, the seatbelt lock mechanism 37 is put operative. Subsequently, after the CPU 90 has changed the lock cancellation flag F to the state of 0 in step S8, the sequence logic proceeds to step S9 for a judgment as to a time T.

When it is judged in step S6 that the lock cancellation flag F is down or in the state of 0, the CPU 90 keeps the solenoid 58 of the lock canceling mechanism 38 released and the lock cancellation flag F in the state of 0. In consequence, the seatbelt lock mechanism 37 remains operative. Then, the sequence logic proceeds directly to step S9 for a judgment as to a time T. The preceding steps S2–S8 including step S2v1 are repeated until it is judged that the predetermined time $T_0$ has been reached in step S9.

After having waited for a lapse of the predetermined time $T_0$ in step S9, another judgment is made in step S9v2 as to whether the battery voltage E is higher than the predetermined voltage $E_0$. The preceding steps S2–S9 including step S2v1 are repeated until the battery voltage E has become below the predetermined voltage $E_0$. After having waited for attainment of the predetermined voltage $E_0$, a further judgment is made in step S10 as to whether the lock cancellation flag F is down or in the state of 0. The sequence logic is brought to completion directly when the answer is affirmative (YES), or otherwise after having released the solenoid 58 of the lock canceling mechanism 38 to put the seatbelt lock mechanism 37 operative in step S11 when the answer is negative (NO).

According to the front seatbelt system described above, the control unit, CPU 90, continuously keeps excitation of the solenoid 58 of the lock canceling mechanism 38 even after a lapse of the predetermined time $T_0$ while the battery voltage E is higher than the predetermined voltage $E_0$. While the battery is so high in voltage, in other words, while the battery has sufficient power to spare, the control unit keeps excitation of the solenoid 58 of the lock canceling mechanism 38 even after a lapse of the predetermined time $T_0$. This secures front seat passenger's safety upon an occurrence of a collision admitting that the front seatbelt system lightens the burden imposed on the battery.

Figure 11:
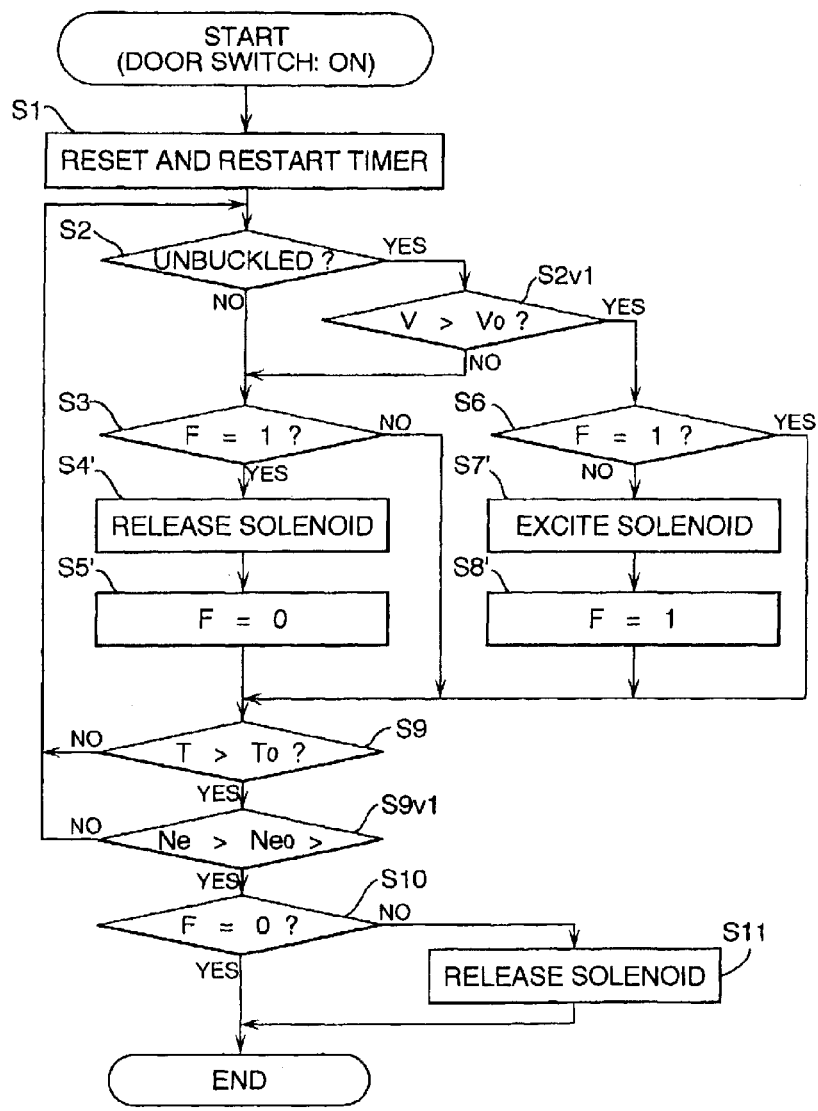
FIG. 11 is a flowchart illustrating another seatbelt lock canceling control for the other seatbelt control system shown in FIG. 9.

FIG. 11 shows a variation of the programmed seatbelt lock control routine shown in FIG. 8 in which the control unit does not put the seatbelt lock mechanism 37 inoperative when the vehicle is running at a speed V higher than a predetermined sped $V_0$ even while the seatbelt 27 is undone and at least one of the front and rear doors 2 and 3 is open or not properly closed.

As shown in FIG. 11, the sequence logic commences when the CPU 90 receives a control signal from at least one of the door switches 71–76, i.e. when at least one of the front and rear doors 2 and 3 is open or not properly closed. When the sequence logic commences and control proceeds to step S1 where an internal timer 91 is reset and immediately starts to count a time T. Subsequently, a judgment is made in step S2 as to whether the front seatbelts 27 is undone or unbuckled. When the answer is negative (NO), i.e. when the seatbelt 27 has been buckled up, then, another judgment is made in step S3 as to whether a lock cancellation flag F is up or in the state of 1. At this time, the solenoid 58 of the lock canceling mechanism 38 has been released and, in consequence, the answer is affirmative (YES), then, the CPU 90 removes the lock cancellation signal to release the solenoid 58 of the lock canceling mechanism 38 in step S4'. As a result, the seatbelt lock mechanism 37 is put operative. Subsequently, after the CPU 90 has changed the lock cancellation flag F to the state of 0 in step S5', the sequence logic proceeds to step S9 for a judgment as to a time T. When it is judged in step S3 that the lock cancellation flag F is down or in the state of 0, the sequence logic proceeds directly to step S9 for a judgment as to a time T.

On the other hand, when the answer to the judgment as to the seatbelt 27 made in step S2 is affirmative (YES), i.e. when the seatbelt 27 has been undone or unbuckled, then, another judgment is made in step S2$v$1 as to whether a vehicle speed V is higher than the predetermined speed $V_0$. Only when the vehicle is running at a vehicle speed V higher than the predetermined speed $V_0$, the sequence logic proceeds to step S6 where a judgment is made as to whether the lock cancellation flag F is up or in the state of 1. When the answer negative (NO), i.e. when the solenoid 58 of the lock canceling mechanism 38 remains released, then, the CPU 90 provides a lock cancellation signal to excite the solenoid 58 of the lock canceling mechanism 38 so as thereby to put the seatbelt lock mechanism 37 inoperative in step S7'. Subsequently, after the CPU 90 has changed the lock cancellation flag F to the state of 1 in step S8', the sequence logic proceeds to step S9 for a judgment as to a time T. When it is judged in step S6 that the lock cancellation flag F is up or in the state of 1 in step S8', the sequence logic proceeds directly to step S9 for a judgment as to a time T.

The preceding steps S2–S8' including step S2$v$1 are repeated until it is judged that the predetermined time $T_0$ has been reached in step S9. After having waited for a lapse of the predetermined time $T_0$ in step S9, another judgment is made in step S9$v$1 as to whether the engine speed Ne is higher than the predetermined speed $Ne_0$. The preceding steps S2–S9 including step S2$v$1 are repeated until it is judged in step S9$v$1 that the engine speed Ne has become below the predetermined speed $Ne_0$. After having waited for attainment of the predetermined speed $Ne_0$, a further judgment is made in step S10 as to whether the lock cancellation flag F is down or in the state of 0. The sequence logic is brought to completion directly when the answer is affirmative (YES), or otherwise after having released the solenoid 58 of the lock canceling mechanism 38 so as thereby to put the seatbelt lock mechanism 37 operative in step S11 when the answer is negative (NO).

According to the front seatbelt system, in light of the really very little chance that somebody jumps in the vehicle running at a speed V higher than the predetermined speed $V_0$, the solenoid 58 of the lock canceling mechanism 38 is excited to keep the seatbelt lock mechanism 37 operative in case of a failure in operation of the buckle switch 80R or 80L while the vehicle is running, so as thereby to secure front seat passenger's safety upon an occurrence of a collision.

According to the front seatbelt system of this embodiment, in an unlikely event that the buckle switch 80R, 80L is broken down and, in consequence, either always or never provides a control signal in spite of having buckled up or undone the seatbelt 27, the sequence logic follows steps S3, S4' and S5' to deactivate the lock canceling mechanism 37 to put the seatbelt lock mechanism 38 operative whenever the vehicle with a door open or not properly closed is running at a speed V higher than the predetermined speed $V_0$. Therefore, the seatbelt system secures front seat passenger's safety upon an occurrence of a collision even when the buckle switch 80L and/or 80R accidentally fail to operate.

In the previous embodiments, the judgment as to a vehicle speed V relative to the predetermined speed $V_0$ made in step S2$v$1 in the programmed seatbelt lock control sequence shown in FIG. 8, 10 or 11 may be replaced with a judgment as to a shift lever position that represents that the vehicle is running or parking.

Figure 12:
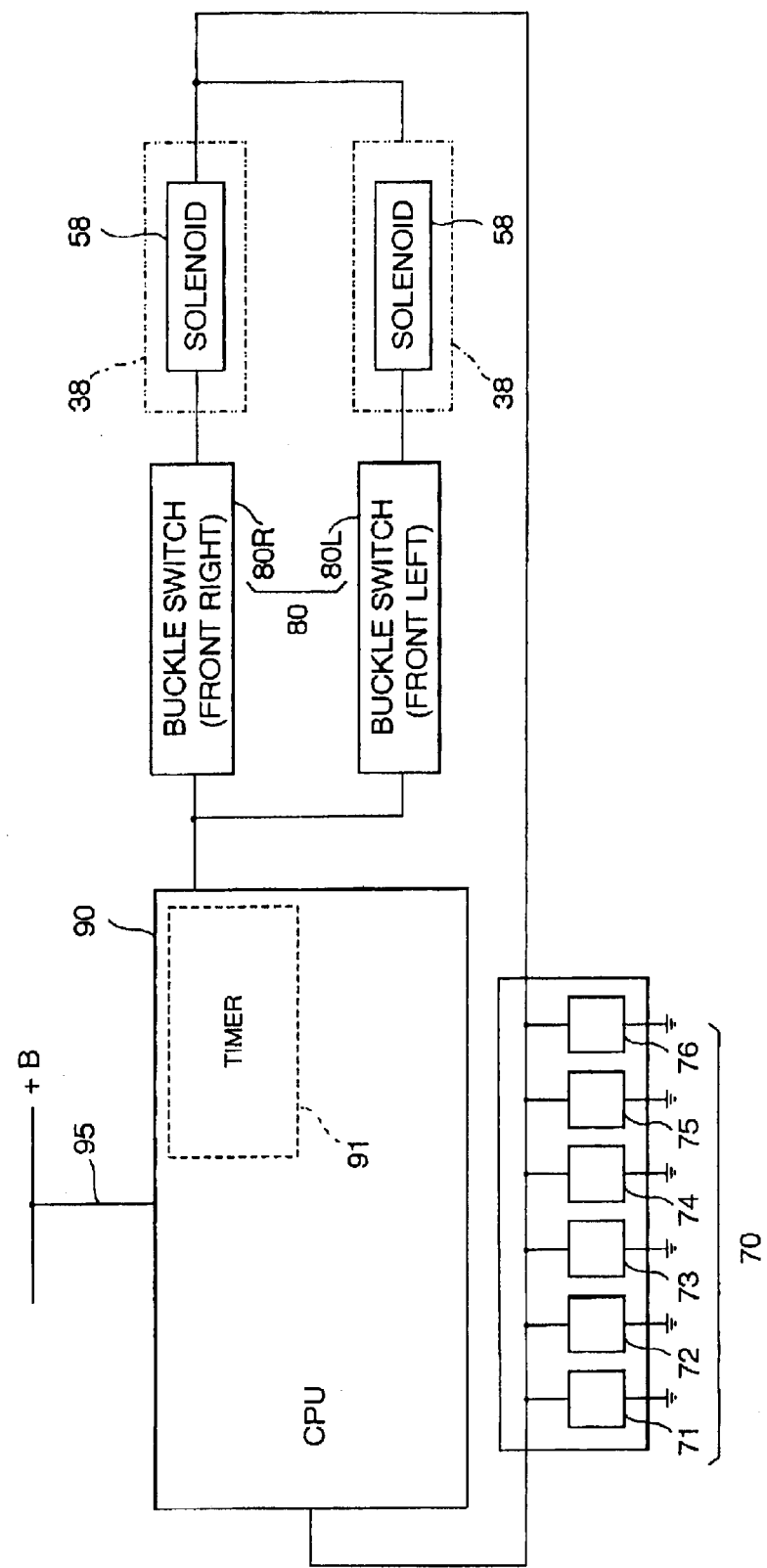
FIG. 12 is a block diagram illustrating a seatbelt control system of the front seatbelt system according to another embodiment of the present invention.
Figure 13:
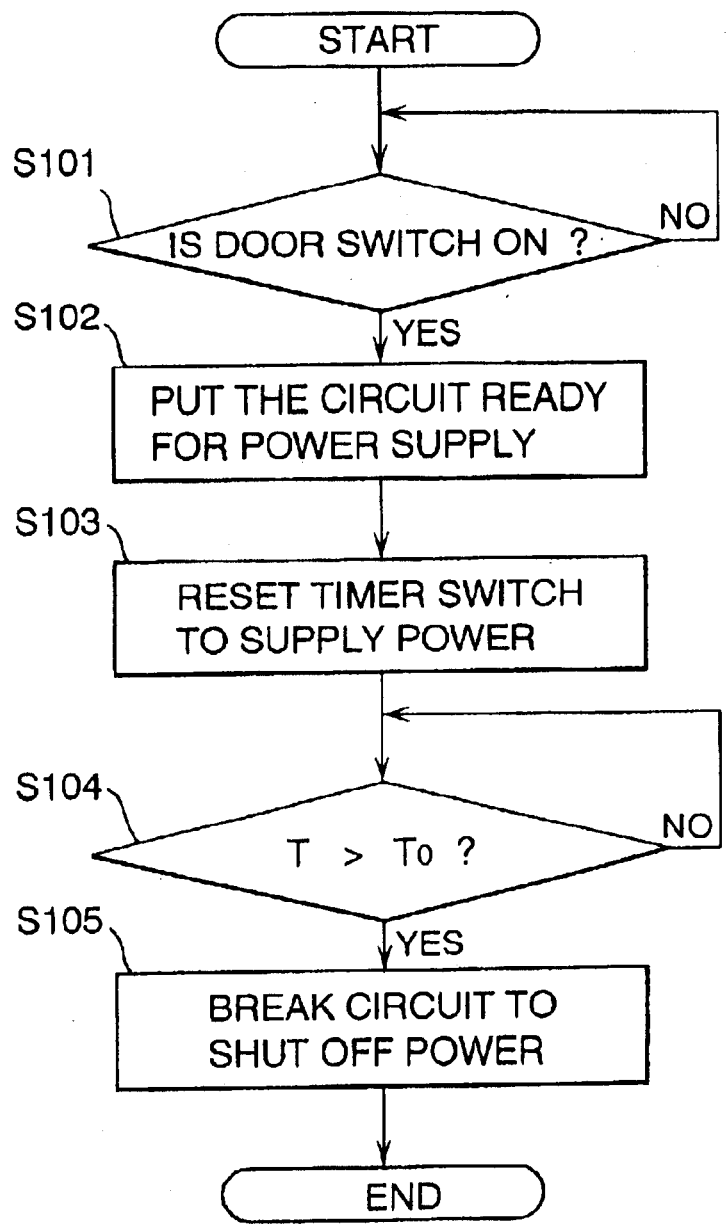
FIG. 13 is a flowchart illustrating seatbelt lock canceling control for the seatbelt control system shown in FIG. 12.

FIGS. 12 and 13 shows a front seatbelt system according to a further embodiment of the present invention which performs seatbelt lock control similar to the programmed seatbelt lock control illustrated by the flowchart shown in FIG. 6 by a hardware configuration with intention to give priority to and place an emphasis on front seat passenger's safety. As shown in FIG. 12, a control circuit for the front seatbelt system, the control circuit comprises a CPU 90 having an internal timer switch 91A connected to a battery B through a power transmission line 90, door switch means 70A connected in series to the battery B through the internal timer switch 91A and seatbelt switch means 70 connected in series between the internal timer switch 91A and the solenoid 58 of the lock canceling mechanism 38 of the front seatbelt system. The door switch means 70 comprises right and left door switches 71 and 72 for the right and left front door 2, respectively, upper and lower door switches 73 and 74 for the right rear door 3, and upper and lower door switches 75 and 76 for the left rear door 3 which are connected in parallel to one another. The seatbelt switch means 80 comprises right and left buckle switches 80R and 80L each of which is connected in series between the internal timer switch 91A and the door switch means 70 and which are connected in parallel to each other.

The solenoid 58 of the lock canceling mechanism 38 of the front seatbelt system for the front right seat is disposed in the electric power supply circuit between the buckle switch 80R of the front seatbelt system for the front right seat and the seat switch means 70. Similarly, the solenoid 58 of the lock canceling mechanism 38 of the front seatbelt system for the front left seat is disposed between the buckle switch 80L of the front seatbelt system for the front left seat and the door switch means 70. The door switches 71–76 are connected in parallel to one another. Each of the door switches 71–76 turns ON to trigger electric power supply to the solenoid 58 of the lock canceling mechanism 38 through the power line 90. Each of the buckle switches 80R and 80L turns ON to interrupt electric power supply to the solenoid 58 of the lock canceling mechanism 38 when the seatbelt 27 is undone, i.e. when the tongue 32 of the seatbelt 27 is unlatched from the buckle 25. Accordingly, the front seatbelt system excites the solenoid 58 of the lock canceling mechanism 38 to put the seatbelt lock mechanism 37 operative when at least one of the door switches 71–76 turns ON while the buckle switch 80R or 80L turns OFF, i.e. when at least one of the front and rear doors 2 and 3 opens while the seatbelt 27 is undone.

FIG. 13 is an explanatory flowchart illustrating seatbelt lock control for the front seatbelt system shown in FIG. 12. When at least one of the door switches 71–76 turns ON in step S101, this indicates the fact that at least either one of the front and rear doors 2 and 3 is opened, then, the control circuit is put ready for power supply to the solenoid 58 of the lock canceling mechanism 38 for each front seatbelt system only in the case where the buckle switch 80L is ON in step S102, but otherwise, remains broken to releases the solenoid 58 of the lock canceling mechanism 38 so as thereby to keep the seatbelt lock mechanism 37 operative. Immediately after the control circuit is put ready for power supply, the timer switch 91A is reset to supply power to the solenoid 58 of the lock canceling mechanism 38 and tarts to count a time in step S103. As a result, the solenoid 58 of the lock canceling mechanism 38 is excited to put the seatbelt lock mechanism 37 inoperative. When the timer switch 91A has counted a predetermined time $T_0$ in step S104, or if the seatbelts 27 is buckled up at any time even while the timer switch 91A is still counting a time, the control circuit is broken and releases the solenoid 58 of the lock canceling mechanism 38 to put the seatbelt lock mechanism 38 operative in step S105.

As described above, the front seatbelt system shown in FIGS. 12 and 13 releases the solenoid 58 of the lock canceling mechanism 38 to put the seatbelt lock mechanism 37 always operative except for the case where the seatbelt 27 is undone while at least either one of the front and rear doors 2 and 3 is open. It may be no exaggeration to say that this case occurs only in a parked vehicle. Accordingly, the front seatbelt system prioritizes front seat passenger's safety.

As described above, the front seatbelt system of the present invention prevents the seatbelt 27 from being locked while at least one of doors is open and puts the seatbelt 27 ready for locking when the seatbelt 27 is buckled up even while any one of the doors is open or improperly closed, so that the front seatbelt system restrains an front seat passenger against the seat to protect the front seat passenger upon occurrence of a collision while driving even with the door not properly closed.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A front seatbelt system for a front seat of a vehicle equipped with a double door construction in which a front door and a rear door overlapped by an rear end of the front door from the outside of the vehicle open outwardly forward and rearward, respectively, to form a single uninterrupted doorway opening to a passenger compartment of the vehicle and the front door allows the rear door to open and close while the front door is open, said front seatbelt system comprising:
    a retractor installed in the rear door and retracting a seatbelt therein;
    seatbelt lock means for locking said seatbelt being drawn out from said retractor when said seatbelt attains a predetermined acceleration;
    lock canceling means for putting said seatbelt lock means inoperative when activated;
    door detection means for detecting whether at least either one of the front and rear doors is open;
    seatbelt detection means for detecting whether said seatbelt is unbuckled; and
    control means for activating said lock canceling means to put said seatbelt lock means inoperative when said seatbelt detection means detects said seatbelt that is unbuckled while said door detection means detects at least either one of the front and rear doors that is open and deactivating said lock canceling means to put said seatbelt lock means operative when said seatbelt detection means detects said seatbelt that is buckled up while said door detection means detects at least either one of the front and rear doors that is open.

2. A front seatbelt system as defined in claim 1, wherein said control means activate said lock canceling means to put said seatbelt lock means inoperative when a vehicle speed sensor detects a vehicle speed lower than a predetermined speed.

3. A front seatbelt system as defined in claim 2, wherein said lock canceling means comprises electrically operated means and said control means excites said electrically operated means to put said seatbelt lock means inoperative and releases said electrically operated means to put said seatbelt lock means operative.

4. A front seatbelt system as defined in claim 3, wherein said control means keeps said electrically operated means excited while an engine speed sensor detects an engine speed higher than said predetermined speed.

5. A front seatbelt system as defined in claim 3, wherein said control means keeps said electrically operated means excited while a battery voltage sensor detects a battery voltage higher than a predetermined voltage ($E_0$).

6. A front seatbelt system as defined in claim 3, wherein said control means releases said electrically operated means after a lapse of said predetermined time from a point of time at which said electrically operated means is excited.

7. A front seatbelt system as defined in claim 6, wherein said control means keeps said electrically operated means excited still after a lapse of said predetermined time while an engine speed sensor detects an engine speed higher than said predetermined speed.

8. A front seatbelt system as defined in claim 6, wherein said control means keeps said electrically operated means excited still after a lapse of said predetermined time while a battery voltage sensor detects a battery voltage higher than a predetermined voltage ($E_0$).

9. A front seatbelt system as defined in claim 1, wherein said lock canceling means comprises electrically operated means and said control means excites said electrically operated means to put said seatbelt lock means inoperative and releases said electrically operated means to put said seatbelt lock means operative.

10. A front seatbelt system as defined in claim 9, wherein said control means keeps said electrically operated means excited while an engine speed sensor detects an engine speed higher than said predetermined speed.

11. A front seatbelt system as defined in claim 9, wherein said control means keeps said electrically operated means excited while a battery voltage sensor detects a battery voltage higher than a predetermined voltage ($E_0$).

12. A front seatbelt system as defined in claim 9, wherein said control means releases said electrically operated means after a lapse of said predetermined time from a point of time at which exciting said electrically operated means.

13. A front seatbelt system as defined in claim 12, wherein said control means keeps said electrically operated means excited still after a lapse of said predetermined time while an engine speed sensor detects an engine speed higher than a predetermined speed.

14. A front seatbelt system as defined in claim 12, wherein said control means keeps said electrically operated means excited still after a lapse of a predetermined time while a battery voltage sensor detects a battery voltage higher than a predetermined voltage ($E_0$).

15. A front seatbelt system as defined in claim 1, wherein said control means deactivate said lock canceling means to put said seatbelt lock means operative when a vehicle speed sensor detects a vehicle speed higher than a predetermined speed even when said seatbelt detection means detects said seatbelt that is unbuckled while said door detection means detects at least either one of the front and rear doors that is open.

16. A front seatbelt system as defined in claim 1, wherein said lock canceling means comprises an electrically operated means disposed in an electric power supply means, said door switch means comprises door switches disposed in series to said electrically operated means in said electric power supply means and operative to trigger electric power supply to said electrically operated means when at least either one of the front and rear doors is open, and seatbelt switch means comprises a buckle switch disposed in series to said electrically operated means and said door switch means in said electric power supply means and operative to close said electric power supply means when said seatbelt is unbuckled and to break said electric power supply means when said seatbelt is buckled up, said electric power supply means interrupting said electric power supply to said electrically operated means after a lapse of said predetermined time from a point of time at which said electric power supply is triggered.

\* \* \* \* \*